C. F. DALLMAN & F. SCHOEPKE.
UNLOADING SKID.
APPLICATION FILED APR. 23, 1915.
1,298,905.
Patented Apr. 1, 1919.
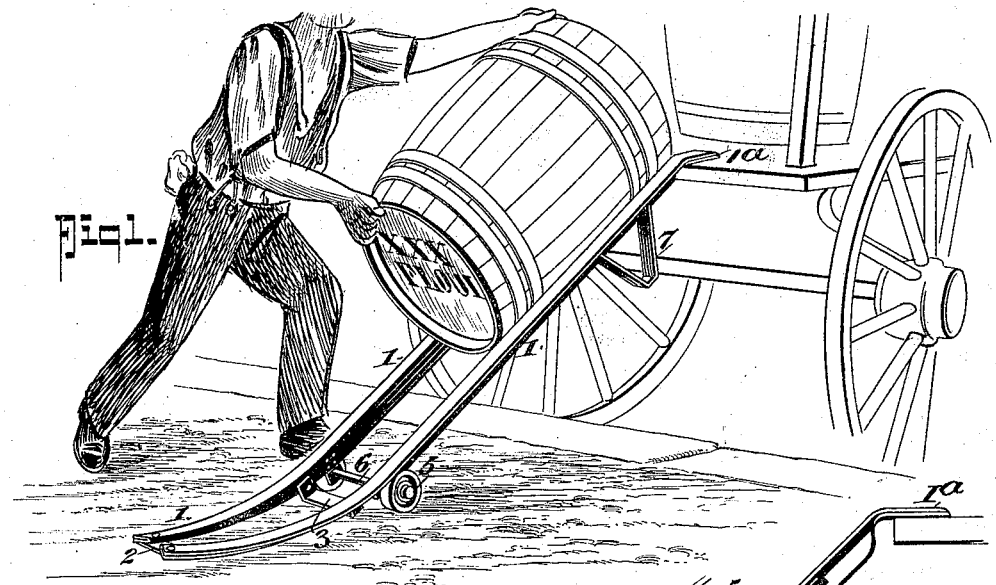
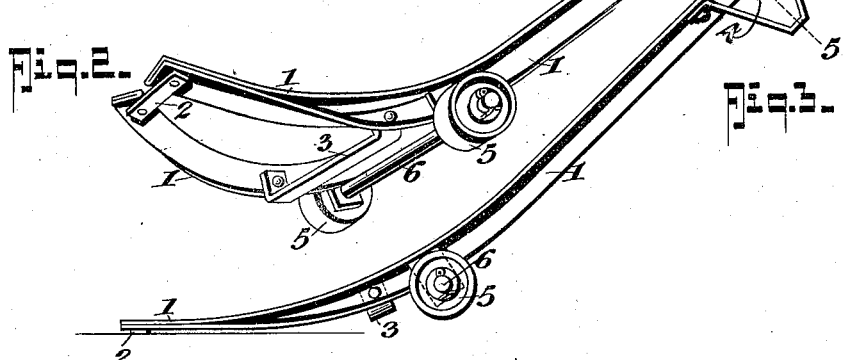
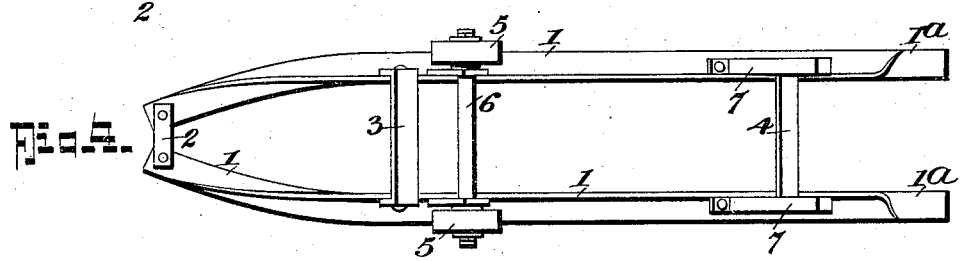
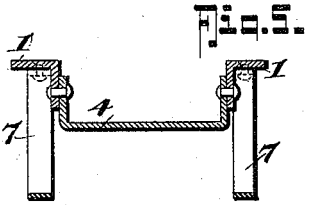
WITNESSES:
John G. Schrott
W. E. Beck
INVENTORS
C. F. Dallman,
Frank Schoepke
BY Munn & Co.
ATTORNEYS

UNITED STATES PATENT OFFICE.

CHARLES FRIEDRICH DALLMAN AND FRANK SCHOEPKE, OF ANTIGO, WISCONSIN.

UNLOADING-SKID.

1,298,905.　　　　　Specification of Letters Patent.　　Patented Apr. 1, 1919.

Application filed April 23, 1915. Serial No. 23,346.

*To all whom it may concern:*

Be it known that we, CHARLES F. DALLMAN and FRANK SCHOEPKE, citizens of the United States, and residents of Antigo, in the county of Langlade and State of Wisconsin, have made an Improved Unloading-Skid, of which the following is a specification.

The object of our invention is to provide an improved metallic skid, particularly adapted for use in unloading boxes and barrels from wagons, cars and platforms. It is constructed with special reference to lightness, cheapness, strength, durability, and adaptation for delivery of boxes and barrels with but slight shock and jar.

The details of construction, and operation of the invention are as hereinafter described, and illustrated in the accompanying drawings, in which:

Figure 1 is a perspective view illustrating the practical use of the skid in delivering barrels from a wagon.

Fig. 2 is a partly inverted perspective view of a front portion of the skid.

Fig. 3 is a side view.

Fig. 4 is an inverted plan view.

Fig. 5 is a cross section on the line 5—5 of Fig. 3.

The body of the skid is formed of two longitudinal metallic bars 1—1, and three connecting cross bars indicated by 2, 3, and 4. The longitudinal bars 1—1 are formed of angle iron for the sake of maximum lightness and strength. The rear portions of the said bars are straight and parallel, and terminate in flattened parts 1ª, bent at an obtuse angle and produced by pressing the flanges of the bars together flatwise which adapts them to serve as claws or feet in unloading, as illustrated in Figs. 1 and 3, and also to serve as handles when the skid is used as a truck. The bars are so arranged that their upper flanges project laterally and the others are vertical or pendent, the angles formed by said flanges being on the inside; and on such angles, barrels, casks, etc., slide down easily and without injury.

The front portion of the angle bars 1—1 have two bends; that is to say, they converge as indicated best in Figs. 2–4, and they are also curved upward as shown best in Fig. 3 and the flanges of each bar are pressed flatwise together, and extended laterally, and thus form terminals that rest flat on the ground. It will be seen that the ends of each angle bar 1 coincide in essentials in both form and construction, so as to facilitate delivery of casks, etc., to and from the skid. When the skid is in use, the claws or feet 1ª rest upon the floor of a wagon or the edge of a platform, as shown in Figs. 1 and 3, while the flattened front ends rest on the floor or ground. The front ends are connected by a flat bar 2, which is riveted in place, and the other cross bars 3 and 4 are bent twice at a right angle, whereby they are adapted to be riveted to the pendent flanges of the longitudinal bars, as shown particularly in Figs. 4 and 5. Owing to the upward curve of the front portions of the longitudinal bars 1—1, the skid is particularly adapted for easy delivery of boxes and barrels from wagons, cars and platforms; that is to say, while the boxes and barrels slide somewhat rapidly down the upper portion of the skid, they are partly arrested when they reach the curve and are finally discharged from the flat end portion of the skid without serious jar or shock.

The skid is adapted for use as a truck by applying wheels 5 to an axle 6, which is journaled at the junction of the straight and curved portions of the skid-frame; and the rear portions of the frame are provided with legs 7 in the nature of angular brackets. When the skid is used as a truck, the claws or feet 1ª serve conveniently as handles.

We claim:—

1. A skid including angle iron side bars having their depending wings located at their relatively adjacent sides, the said depending wings from a point adjacent the forward ends of the bars being gradually turned laterally outwardly and adjacent the forward extremities of the said bars lying against the underfaces of the horizontal wings, the said folded forward portions of the bars being gradually curved upwardly from the plane of their rear and intermediate portions and also having their said portions gradually curved inwardly toward each other in the direction of their said extremities.

2. A skid including angle iron side bars having their depending wings located at their relatively adjacent sides, the said depending wings from a point adjacent the forward ends of the bars being gradually turned laterally outwardly and adjacent the forward extremities of the said bars lying against the underfaces of the horizontal wings, the said folded forward portions of the bars being gradually curved upwardly from the plane of their rear and intermediate portions and also having their said portions gradually curved inwardly toward each other in the direction of their said extremities, and a cross bar secured at its ends to the undersides of the first-mentioned bars and extending between and connecting the same.

3. A skid including side members each formed from a length of L-angle iron, the members being disposed with their depending wings located at their relatively adjacent sides, the said side members having their rear portions straight and inclined upwardly in parallel relation, the lower portions of the side members being gradually curved downwardly and forwardly from the lower ends of the straight portions to the forward extremities of the said members and the said lower portions of the said members being gradually curved inwardly toward each other with their said forward extremities slightly spaced, the depending wing of each side member throughout its curved portion being gradually turned laterally outwardly and at and adjacent its forward end lying flat against the underside of the horizontal wing of the said member whereby the extreme forward portions of the members will be substantially flat and horizontally disposed, and a cross bar secured to the undersides of the members at their forward extremities and extending between and connecting the same and also affording a support for the forward end of the skid.

CHARLES FRIEDRICH DALLMAN.
FRANK SCHOEPKE.

Copies of this patent may be obtained for five cents each, by addressing the "Commissioner of Patents, Washington, D. C."